(12) United States Patent
Krull et al.

(10) Patent No.: US 8,147,691 B2
(45) Date of Patent: Apr. 3, 2012

(54) FILTER CARTRIDGE HOUSING ATTACHMENT SYSTEMS

(75) Inventors: Timothy L. Krull, Kearney, NE (US); Farrell F. Calcaterra, Kearney, NE (US)

(73) Assignee: Baldwin Filters, Inc., Rockford, IL (US)

( * ) Notice: Subject to any disclaimer, the term of this patent is extended or adjusted under 35 U.S.C. 154(b) by 779 days.

(21) Appl. No.: 11/858,944

(22) Filed: Sep. 21, 2007

(65) Prior Publication Data
US 2009/0078626 A1 Mar. 26, 2009

(51) Int. Cl.
*B01D 27/08* (2006.01)
*B01D 29/96* (2006.01)

(52) U.S. Cl. .................. 210/232; 210/438; 210/445

(58) Field of Classification Search .............. 210/438, 210/232, 445
See application file for complete search history.

(56) References Cited

U.S. PATENT DOCUMENTS

| | | |
|---|---|---|
| 4,668,393 A * | 5/1987 | Stone .................. 210/304 |
| 4,860,713 A | 8/1989 | Hodgkins |
| 4,862,838 A | 9/1989 | Hodgkins et al. |
| 4,898,668 A | 2/1990 | Hodgkins et al. |
| 4,956,081 A | 9/1990 | Hodgkins et al. |
| 4,976,852 A | 12/1990 | Janik et al. |
| 5,017,285 A | 5/1991 | Janik et al. |
| 5,035,797 A | 7/1991 | Janik |
| 5,084,170 A | 1/1992 | Janik et al. |
| 5,167,826 A | 12/1992 | Eaton |
| 5,186,829 A | 2/1993 | Janik |
| 5,203,994 A | 4/1993 | Janik |
| 5,236,579 A | 8/1993 | Janik et al. |
| 5,271,836 A | 12/1993 | Janik et al. |
| 5,302,284 A | 4/1994 | Zeiner et al. |
| 5,312,546 A | 5/1994 | Janik |
| D356,852 S | 3/1995 | Janik et al. |
| 5,413,711 A | 5/1995 | Janik |
| 5,474,676 A | 12/1995 | Janik et al. |
| 5,484,527 A | 1/1996 | Janik et al. |
| 5,489,384 A | 2/1996 | Janik et al. |
| 5,525,225 A | 6/1996 | Janik et al. |
| 5,578,221 A | 11/1996 | Janik |
| 5,614,091 A | 3/1997 | Janik et al. |
| 5,766,463 A | 6/1998 | Janik et al. |
| 5,794,598 A | 8/1998 | Janik et al. |
| 5,837,137 A | 11/1998 | Janik |
| 5,868,931 A | 2/1999 | Janik et al. |
| 5,887,573 A | 3/1999 | Janik et al. |

(Continued)

FOREIGN PATENT DOCUMENTS

EP 1 070 530 A1 1/2001

(Continued)

*Primary Examiner* — Nam Nguyen
*Assistant Examiner* — Denise R Anderson
(74) *Attorney, Agent, or Firm* — Reinhart Boerner Van Deuren P.C.

(57) ABSTRACT

The present disclosure pertains to a fluid filter having integral attachment means which may take the form of a threaded portion of a filter cartridge. The threaded portion threadably interacts with a complementary threaded portion of a filter mounting to retain the filter cartridge to the filter mounting. The disclosure also pertains to a fluid filter having a cartridge made from two plastic shells welded together. The disclosure also pertains to a fluid filter with filter media positioned within a filter cartridge by an end cap with extending ribs welded to one of the two shells which compose the filter cartridge.

25 Claims, 10 Drawing Sheets

U.S. PATENT DOCUMENTS

| | | |
|---|---|---|
| 5,915,926 A | 6/1999 | Janik et al. |
| 5,938,921 A | 8/1999 | Janik et al. |
| 5,985,144 A | 11/1999 | Janik et al. |
| 6,007,711 A | 12/1999 | Atwood |
| 6,019,890 A | 2/2000 | Janik et al. |
| 6,048,455 A | 4/2000 | Janik |
| D435,631 S | 12/2000 | Janik et al. |
| 6,187,188 B1 | 2/2001 | Janik et al. |
| 6,364,121 B1 | 4/2002 | Janik et al. |
| 6,444,121 B1 | 9/2002 | Maxwell |
| 6,471,070 B2 | 10/2002 | Janik |
| 6,485,643 B2 | 11/2002 | Vardion |
| 6,500,335 B2 | 12/2002 | Janik et al. |
| 6,506,302 B2 | 1/2003 | Janik |
| D479,300 S | 9/2003 | Janik et al. |
| D484,568 S | 12/2003 | Janik et al. |
| 6,740,234 B1 | 5/2004 | Williams et al. |
| 6,755,308 B2 | 6/2004 | Janik et al. |
| 6,843,911 B2 | 1/2005 | Janik et al. |
| 6,863,811 B2 | 3/2005 | Janik |
| 6,881,334 B2 | 4/2005 | Janik |
| 6,911,143 B2 | 6/2005 | Janik |
| 7,137,303 B2 | 11/2006 | Janik et al. |
| 2006/0180539 A1 | 8/2006 | Wolf et al. |

FOREIGN PATENT DOCUMENTS

| | | |
|---|---|---|
| EP | 1 690 581 A1 | 8/2006 |
| WO | WO 2006/091557 A2 | 8/2006 |

\* cited by examiner

FILTER CARTRIDGE HOUSING ATTACHMENT SYSTEMS

FIELD OF THE INVENTION

This invention generally relates to a fluid filter and more particularly relates to housings, mounting systems and/or water indication components for filters.

BACKGROUND OF THE INVENTION

Fluid filters and fuel filter mounting configurations are well known in the art as is exemplified by U.S. Pat. Nos. 5,203,994 and 6,187,188 assigned to Stanadyne Automotive Corp., the disclosures of which are hereby incorporated by reference in their entireties. Conventionally, these types of filter cartridges have employed a housing composed of two metal shells connected together by an outer roll seam. As shown in the '994 patent, a collar retention system may be employed to grab and retain the roll seam and thereby mount the filter cartridge to the base. As shown in the '188, retention tabs may be deformed into the roll seam to provide mounting structure that may be installed into channel retaining grooves integrally formed on an inner surface of the mounting base/filter head. Improvements over the state of the art are disclosed herein.

BRIEF SUMMARY OF THE INVENTION

There are multiple inventive aspects to the present disclosure which are separately claimed for independent and separate protection, but that may also have synergistic effects as combined.

A first inventive aspect is directed toward a transparent portion of the filter cartridge which can void the need for a separate water collection bowl in the case of a fuel filter system, for example. According to this aspect, a filter cartridge includes a housing having upper and lower shells connected together to define an internal cavity. The filter media is arranged in the internal cavity to filter fluid passing through the filter media between an inlet and an outlet. The filter media separates water from fluid when fluid is passed therethrough. The lower shell is at least partially transparent for indicating water in the internal cavity. Additionally a drain valve on the housing is adapted to be opened for draining water from the internal chamber.

A second inventive aspect is directed toward a certain filter cartridge in which part of the cartridge is reusable and another part is disposable. According to this inventive aspect, a filter cartridge includes two shells forming a housing in which each shell has an end wall and an annular wall that are connected. An opening is provided in one of the walls for providing for fluid communication. A ring of filter media is sealingly bonded to the upper shell and arranged to filter fluid within the housing. Further, the lower shell forms a mounting bowl that is reusable such that the upper shell is releasably connected to the lower shell such that the upper shell and filter media are removable and disposable while the mounting bowl can be reusable.

A third inventive aspect is directed toward a filter cartridge which has integrally molded retention tabs for use, for example, in attachment to a mounting base of an engine fuel circuit or other fluid circuit. According to this aspect, a filter cartridge includes upper and lower shells forming a housing with at least one opening provided for fluid communication and filter media arranged in the housing to filter fluid. The lower annular wall of the lower shell extends over the upper end wall of the upper shell to provide a skirt with the skirt of the lower annular wall defining a plurality of discrete retention tabs integrally molded into the skirt at different locations. According to this aspect, it is alternatively contemplated to provide the retention tabs on the upper shell section instead.

A fourth inventive feature is directed towards a new flow reversing end cap that is integrally joined to the housing. A filter cartridge, according to this aspect, includes upper and lower shells which define a housing with a first opening providing for fluid communication and a ring of filter media arranged in the housing. A flow reversing end cap is arranged in the housing and sealingly attached to one end of the filter media. The flow reversing end cap also defines another opening concentric with the opening on the housing with seal members disposed on each of the openings. Another end cap is attached to the other end of the filter media. Ribs are disposed between the flow reversing end cap and the housing and integrally join the flow reversing end cap and the housing.

A fifth inventive aspect pertains to a new filter cartridge construction including upper and lower shells forming a housing including at least one opening and that the housing for providing fluid communication and filter media permanently and irremovably joined to the upper shell section and arranged in the housing to filter fluid. Further, the construction includes an extension of the lower annular wall of the lower shell that extends over and around the upper shell to provide a skirt. Further, the skirt of the lower annular wall defines retention structure adapted for releasable attachment of the filter cartridge (e.g. retention tabs, for example or a readily extending lip that would provide a shoulder for example, or other appropriate structure adapted to retain the filter cartridge to a mounting base).

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION OF THE INVENTION

Figure 1:
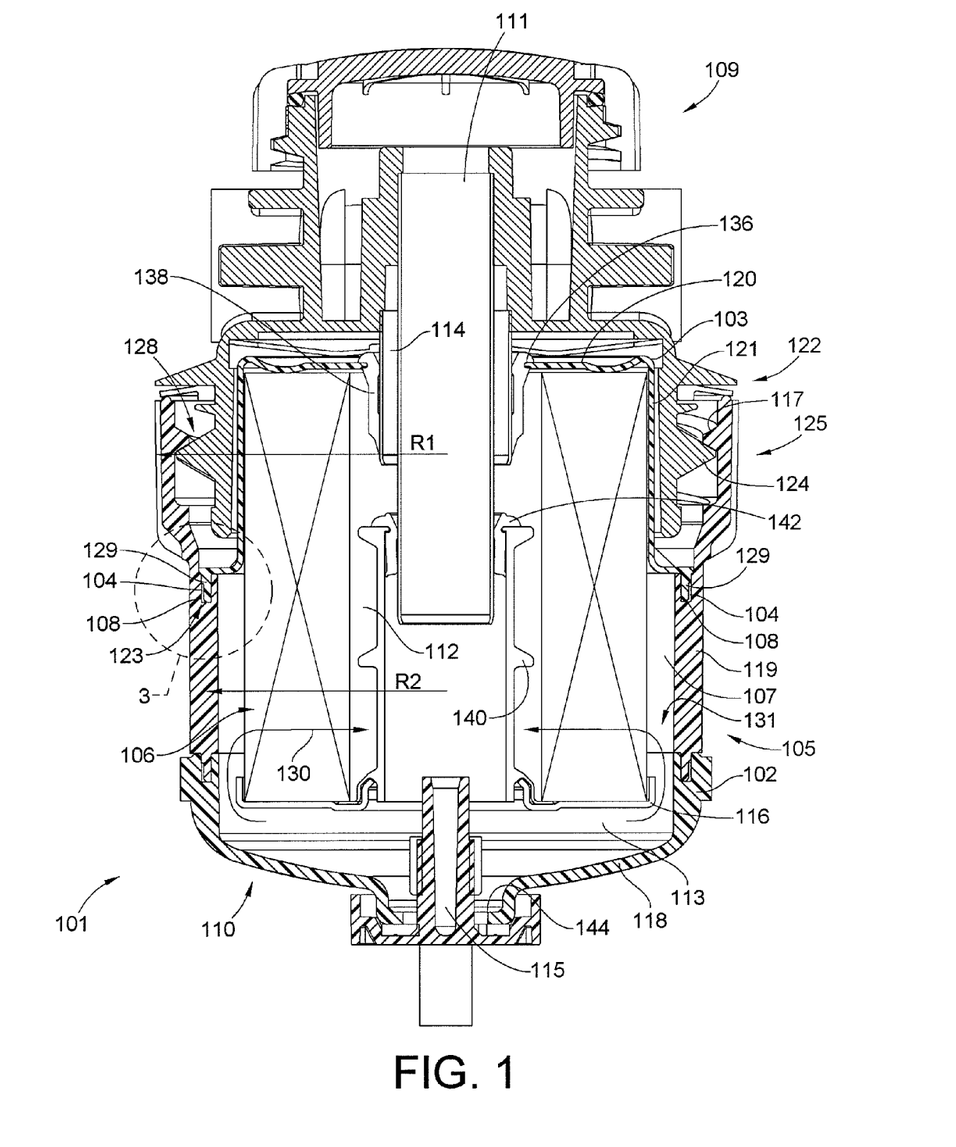
FIG. 1 is a cross-section of a filter in accordance with an embodiment of the present invention.

FIG. 1 illustrates various structural and operational aspects of an embodiment of a filter cartridge 101 in accordance with the teachings of the present invention. The filter cartridge 101 filters impurities from fluids, and particularly liquids such as fuels, lubricants, coolants, and the like. The filter cartridge 101 generally includes a cylindrical filter housing 105 forming a central cavity 107, a tubular ring of filter media 106 housed in the central cavity 107 and attachment structure on the housing 105 in the form of a threaded portion 117 for attaching the filter cartridge 101 to a filter mounting 109 having a cooperating threaded portion 124.

As illustrated in FIG. 1, the cylindrical filter housing 105 includes two cup-shaped shells including a lower shell 102 connected to an upper shell 103. The lower and upper shells 102, 103 combine to generally define an internal central cavity 107. The lower shell 102 forms a bowl including a domed end wall 118 that transitions into a generally cylindrical sidewall 119 which transitions into an axially projecting annular flange 125 with radius R1 greater than the radius R2 of the sidewall 119. The annular flange 125 defines an open end 122 of the lower shell 102 opposite a generally closed end formed by end wall 118.

The lower shell 102 is preferably a plastic molded component and may comprise multiple parts connected together, but alternatively can be a aluminum cast component part and/or a single component, and/or may otherwise be formed from other appropriate materials. As illustrated, the lower shell 102 is formed from molded plastic. The end wall 118, sidewall 119 and annular flange 125 may be unitarily molded as a unitary one piece construction. Alternatively, the end wall 118, sidewall 119, and annular flange 125 may be formed individually and then combined to form an integral piece. In such a configuration, the end wall 118 and sidewall 119 may be combined by chemically bonding, plastic welding, adhesive bonding, etc. As illustrated, the sidewall 119 and annular flange 125 are formed as one piece while the end wall 118 is individually formed and then connected to an end of sidewall 119 opposite annular flange 125.

This method of forming the lower shell 102 as individual components that are later combined may be beneficial when the sidewall 119 and end wall 118 are formed from differing materials. For example, it may be desired to have one of the end wall 118 or sidewall 119 formed from transparent material such as when the lower shell 102 forms a water collection bowl 110. With transparent material, the operator may easily inspect the contents of the collection bowl 110 and use a drain valve 115 to drain separated material in the collection bowl 110. Preferably, the entire lower shell 102 comprises transparent material so as to indicate the level of water contained in the bowl 110 when the filter is used in operation.

The upper shell 103 includes a generally planar circular end wall 120 and a generally cylindrical sidewall 121. The circular end wall 120 closes off the top end of the upper shell 103 (except for the central fluid port) and the cylindrical sidewall 121 provides an open end 123 of the upper shell 103. The sidewall 121 projects axially away from end wall 120. The upper shell 103 may be formed in a similar manner as the lower shell 102.

Figure 2:
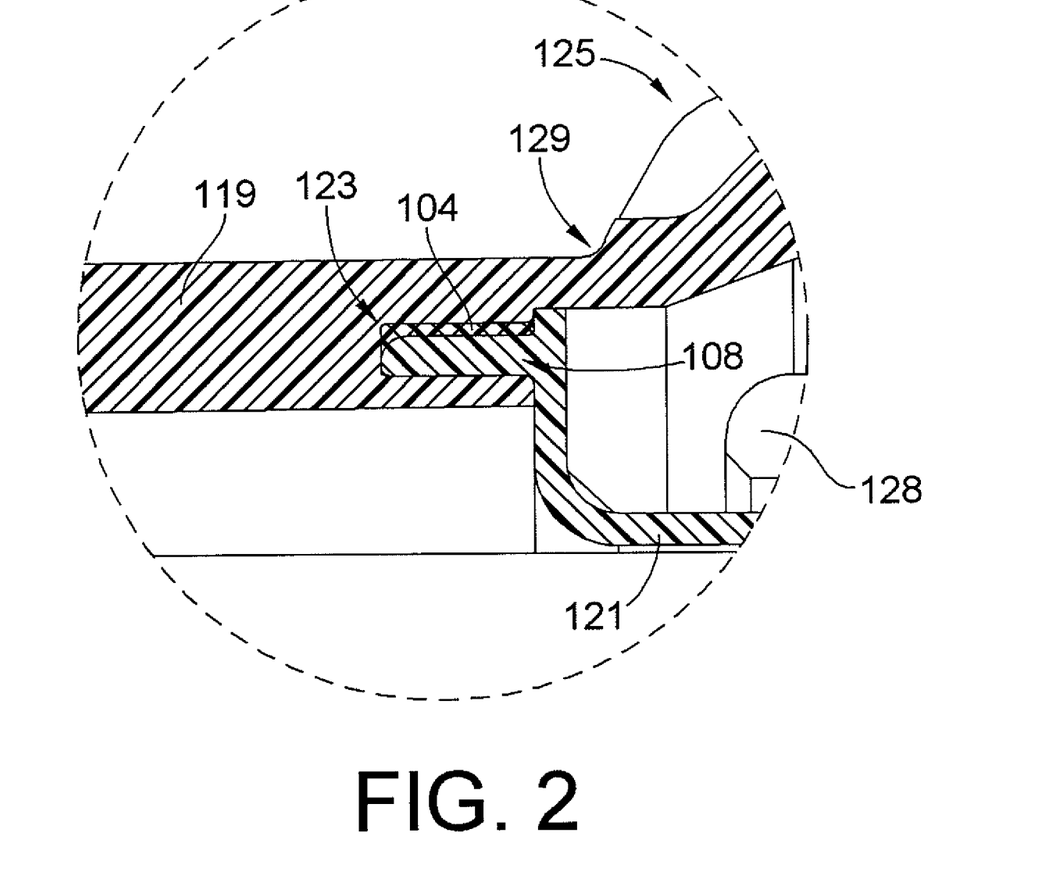
FIG. 2 is an enlarged view of FIG. 1, taken about circle 3.

With additional reference to FIG. 2, an enlarged partial illustration of the connection between the upper and lower shells 102, 103 is illustrated. The sidewall 121 of the upper shell 103 includes circular connector portion 129 proximate the open end 123, which includes a downward depending annular connector ring. The cylindrical filter housing 105 is formed by fitting the circular connector portion 129 of the upper shell 103 into a retainer in the form of a circular U-shaped groove 108 formed in the sidewall 119 of the lower shell 102. The mounting portion 129 may be connected to the U-shaped groove 108 by welding as illustrated in FIGS. 1 and 2 by plastic welds 104 including such welding techniques as induction welding, ultrasonic welding or spin welding. Alternatively, the lower and upper shells 102, 103 may be chemically or adhesively bonded to one another or otherwise mechanically secured to one another. In this embodiment, the two shells 102 and 103 are preferably permanently attached so as to prevent leak paths and such that the entire cartridge is disposable and replaceable.

A circular receiving groove 128 is defined by and between the annular flange 125 of the lower shell 102 and the sidewall 121 of the upper shell 103. The groove 128 provides clearance for mating with structure projecting from the corresponding mounting head 109. The groove 128 also provides clearance for threaded portion 117 for mating with the threaded portion 124 of the filter mounting head 109 (also known as a mounting adaptor).

The cylindrical filter housing 105 releasably attaches to the filter mounting head 109 using threaded portion 117 incorporated directly into the inner surface of the annular flange 125 of sidewall 119 of the lower shell 102. This threaded portion 117 interacts with the threaded portion 124 of the filter mounting 109 to releasably threadably attach the filter cartridge 101 to the filter mounting head 109. The threaded portion 124 of the filter mounting 109 interacts with the threaded structure 117 of the sidewall 119 within the cavity 128. In the illustrated embodiment, the threads are molded directly into sidewall 119, and particularly annular flange 125, during manufacture of the lower shell 102.

Turning then to the filter media 106 in this exemplary embodiment, the filter media 106 is a tubular ring forming a center cavity 112 and extends from the upper shell axially through the central cavity 107 of the filter housing 105 to an end cap 116. The filter media 106 may be any standard filter media including preferably pleated filter paper formed at least in part from cellulose material. In the disclosed fuel filter embodiment, the filter media 106 can be and is preferably of a known grade suitable for coalescing water and thereby preventing passage of water through the media and for separating particulates out of the fluid flow. The filter media thus can perform dual functions, water separation and particulate filtration.

The filter media 106 is sealingly and permanently bonded to the upper shell 103 such as by plastisol or other adhesive or by directly embedding the upper end of the filter media into the plastic material of the upper shell. In this regard, the upper shell 103 may effectively serve dual roles as the upper end cap for the filter media in addition to working as part of the outer housing. The upper shell 103 includes a central circular opening 136 that can be bounded by a circular sealing grommet 138 to facilitate fluid flow into and out of the filter cartridge. The bottom end of the filter media 106 is sealingly and permanently bonded to a bottom end cap 116, preferably with plastisol and/or in a similar manner to the upper shell. The bottom end cap 116 may be of two piece construction to include a tubular extension 140 having an opening fitted with a circular sealing grommet 142. This above arrangement is particularly useful for a filter system in which the filter head includes two concentric fluid inlet and outlet pipes for fluid communication with the cartridge through the single opening 136. However, other embodiments may include more than one opening with discrete separate external inlet and outlet ports.

When mounted to a filter head as shown in FIG. 1, unfiltered fuel (e.g. from the fuel tank) flows into the filter cartridge through the inlet fuel passage 111 (e.g. the central concentric tube of the mounting head) and travels axially through the center cavity 112 of the filter media 106. The inlet flow is connected through the tubular extension 140 to a bottom flow passage 113 formed in the bottom end cap 116. Generally following fuel flow path 130, the unfiltered fuel would then travel around the bottom end of the internal filter element to outer annular chamber 131 and then radially inward through the filter media 106 to a clean fluid chamber inside of the filter media 106. As the fluid passes through the filter media 106, impurities are filtered from the fuel. The now clean fuel can pass axially into the clean fuel outlet 114 of the filter mounting head 109 and thereby exit the filter cartridge 101 through external opening 136.

Preferably for fuel filtration applications, the filter media 106 is impermeable to water and when the dirty fuel passes through the filter media 106 water coalesces on outside of the filter media 106. The coalesced water will drop down axially into the collection bowl 110, integrally formed into the filter cartridge 101 at the end of the filter cartridge 101 opposite the filter mounting 109. As indicated above, the collection bowl 110 may be transparent, allowing a user to inspect the quantity of water collected within the collection bowl 110, and to determine whether the drain valve 115 needs to be opened to allow the collected water to drain through the drain valve 115 (also known as a "drain cock") out of the collection bowl 110. The drain valve 115 closes a drain port 144 at the bottom of the housing and can be manually opened (e.g. twisted/screwed) to facilitate water removal.

Figure 3:
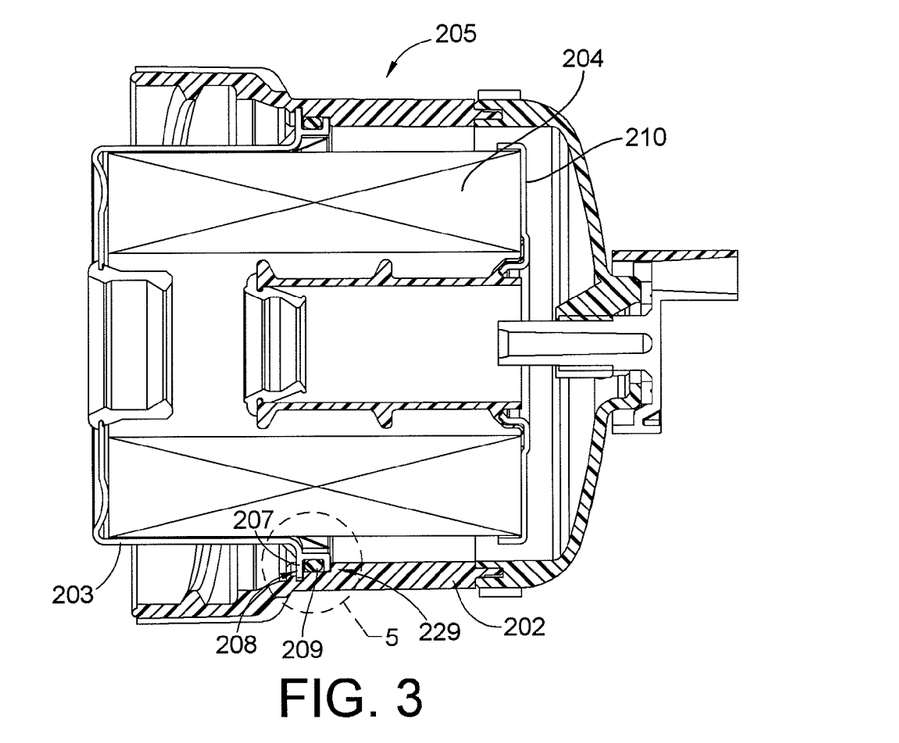
FIG. 3 is a cross-section of a filter in accordance with another embodiment of the present invention, the cross-section being the same cross-section as in FIG. 1.
Figure 4:
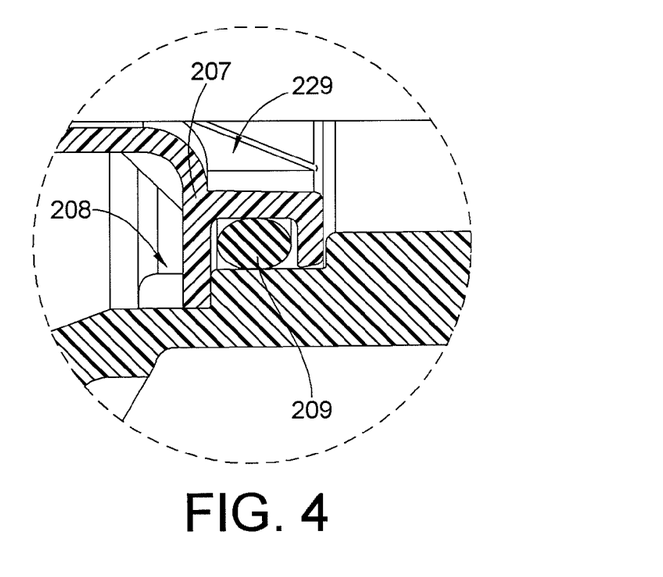
FIG. 4 is an enlarged view of FIG. 3, take about circle 5.

FIGS. 3 and 4 illustrate a further embodiment of a filter cartridge much like the first embodiment except that the upper shell 203 is releasably attached to lower shell 202. In this embodiment, the upper shell 203 is removable and disposable along with the filter media 204 carried thereby, while the lower shell 202 can provide a reusable collection bowl that may not need to be replaced at each maintenance interval (the drain cock carried thereby is also therefore reusable). Specifically, the filter media 204 can be permanently bonded to the upper shell 203 such as by plastisol or other suitable means as indicated for the first embodiment. The upper shell 203 forms both a part of the housing and the upper end cap of the filter media 204. The lower end cap 210, also permanently and sealingly bonded to the filter media 204 is disposable along therewith as well.

To provide for this feature, a releasable connection 208 is provided that may include a snap fit, a screw interface or other releasable connection between the upper and lower shells 203 and 202. Also the releasable connection 208 may more simply include a press fit or interference fit given the lower reusable shell 202 when mounted into engagement with the filter head sandwiches the upper shell 203 therebetween and may slightly axially compress the upper shell 203. In this embodiment, the inner surface of the lower shell 202 configured to receive and engage a corresponding extending leg 207 of the U-shaped connector portion 229 of the upper shell 203. An elastomeric sealing O-ring 209 positioned within an annular groove the U-shaped connector portion 229 and seals this connection to prevent leakage. Because the upper shell 203 is not permanently secured to lower shell 202, this embodiment beneficially allows the lower part of the filter housing 205 formed by the lower and upper shells 202, 203 to potentially be reused.

The first and second embodiments also can be used to modify existing commercially employed collar retention systems according to U.S. Pat. No. 5,203,994. Specifically, the retention collar of such systems can be thrown away or otherwise removed from use. Instead, the filter cartridges of the first two above embodiments can be threaded and mounted directly onto the filter head. As a result, an intervening separate structure is eliminated simplifying the existing configurations in the field.

Figure 5:
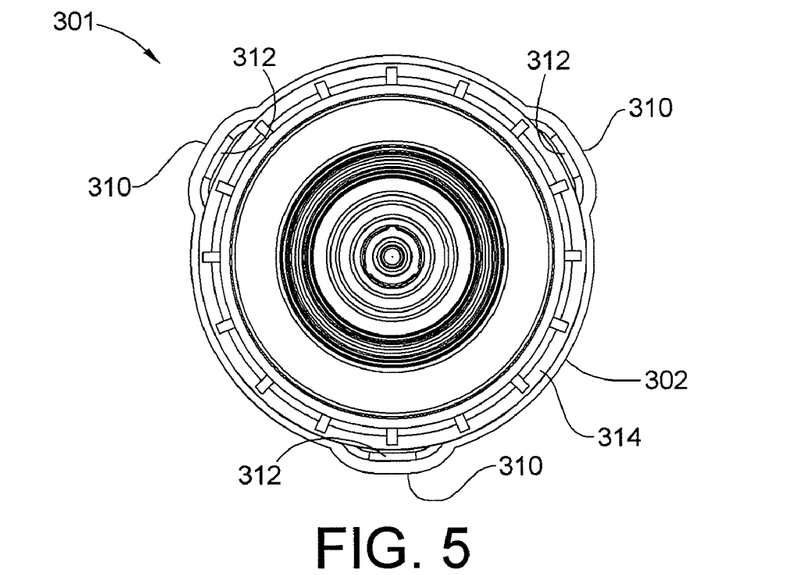
FIG. 5 is an end view of the filter shown in FIG. 7.
Figure 6:
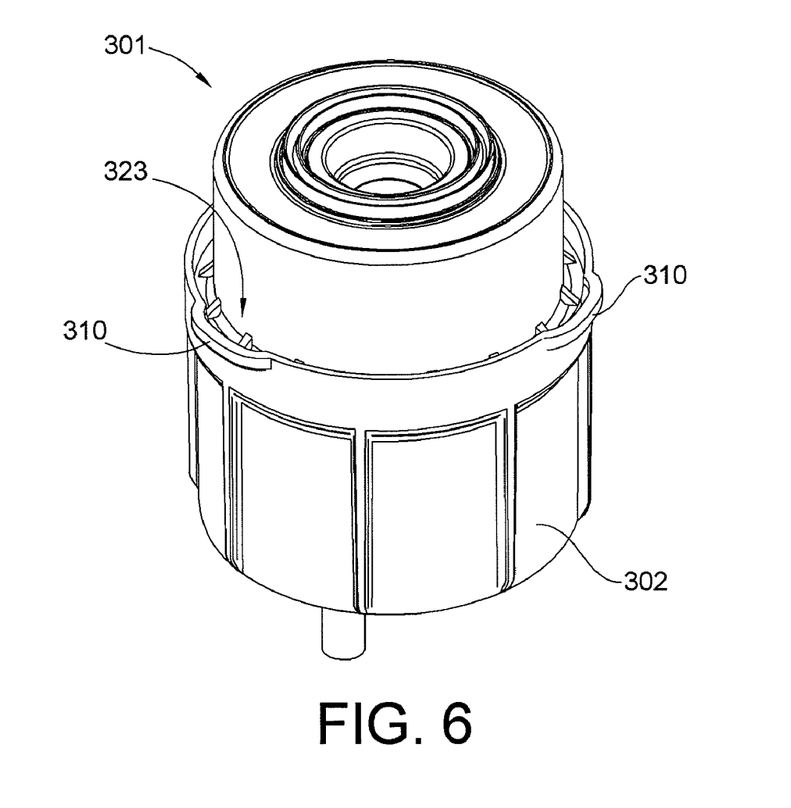
FIG. 6 is an isometric view of the filter shown in FIG. 7.
Figure 7:
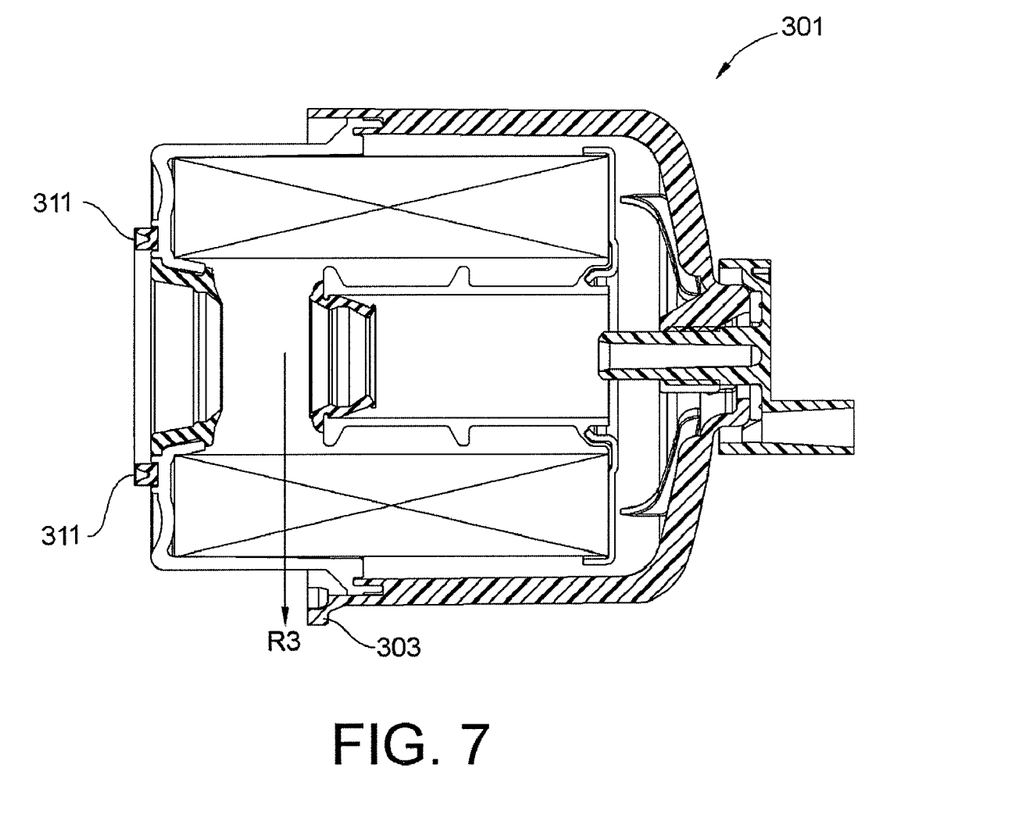
FIG. 7 is a cross-section of a filter in accordance with another embodiment of the present invention, the cross-section being the same cross-section as in FIG. 1.

FIGS. 5 and 6 illustrate a further embodiment of a filter cartridge 301 in accordance with the teachings of the present invention that can be used with different filter head configurations (including collar retention systems such as shown in U.S. Pat. No. 5,203,994 or retention channel systems such as shown in U.S. Pat. No. 6,187,188). In this embodiment, the filter cartridge 301 includes a plurality of radially outward extending retention tabs 310. More particularly, the lower shell 302 has three retention tabs 310 integrally formed into the outer surface of the lower shell 302 proximate open end 323 projecting radially outward. In a preferred embodiment, the retention tabs 310 are formed while molding the lower shell 302 and thereby integrally molded into the shell. As a beneficial result, no subsequent deformation action or forming needs to be done subsequent thereto.

The retention tabs 310 can be grabbed by the collar of a filter head as shown in the collar retention system of U.S. Pat. No. 5,203,994. Alternatively, the retention tabs 310 can be installed and twisted into the inner retention channels of the filter head according to channel retention systems such as shown in U.S. Pat. No. 6,187,188. As a result, this embodiment provides a multi-purpose design adapted for multiple applications/retention systems.

Figure 8:
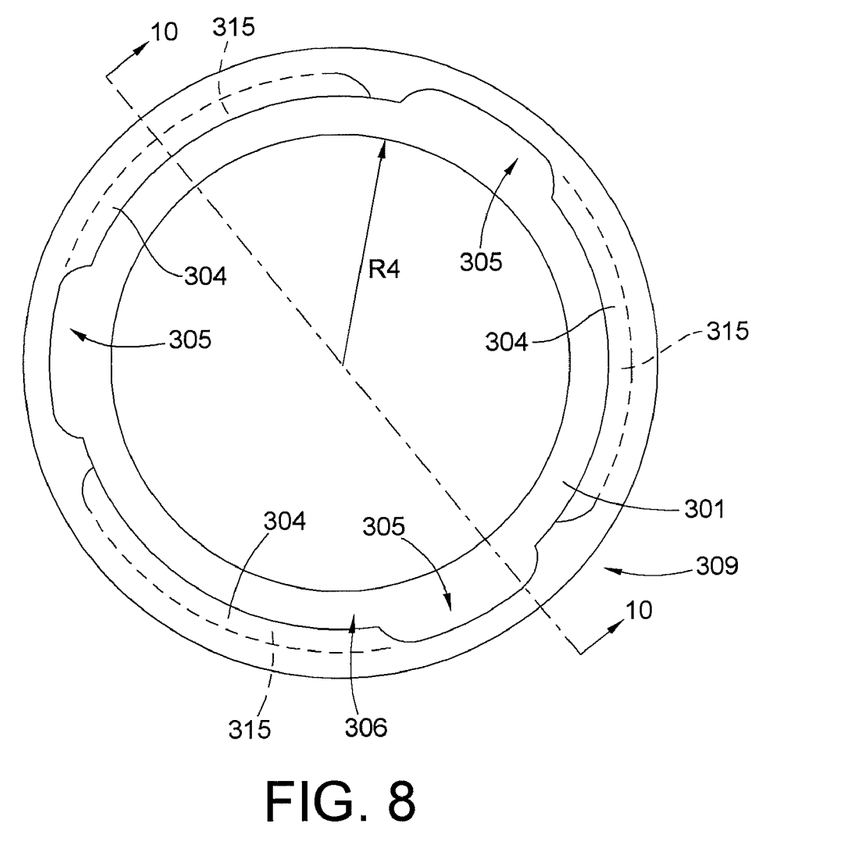
FIG. 8 is a map view of a typical filter mounting to which a filter as shown in FIG. 7 would attach.
Figure 9:
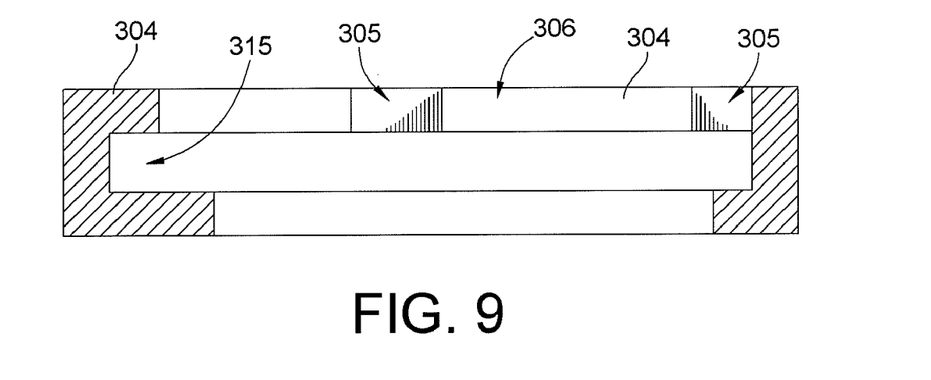
FIG. 9 is a cross-section of a filter mounting as shown in FIG. 8, the cross-section being taken about a diameter of the filter mounting.

To illustrate a channel retention system, the relevant part of the filter mounting head 309 is shown in FIGS. 8 and 9 in simplified form. These figures show generally the channel retention structure for securing the filter cartridge 301 to the filter mounting 309, but does not illustrate dirty fluid inlet and clean fluid outlet ports. With particular reference to FIG. 8, the filter mounting head 309 includes a plurality of radially inward projecting shoulders 304 that are angularly separated by insertion slots 305. As will be more fully explained below, the insertion slots 305 align with and receive retention tabs 310 of the filter cartridge 301 (not shown in FIGS. 8 and 9) during filter replacement. The shoulders 304 form a wall of the retaining slots 315, which are hidden behind shoulders 304 in FIG. 8 and are more clearly illustrated in the cross section of FIG. 9, for receiving the retention tabs 310 of the filter cartridge 301 when the filter cartridge is mounted to the filter mounting 309.

To mount the filter cartridge 301 on the filter mounting head 309, a user will first align the retention tabs 310 of the filter cartridge with the insertion slots 305. Next, the user will axially insert the filter cartridge 301 through the opening 306 formed by the filter mounting head 309 with the retention tabs 310 passing through the insertion slots 305. As the filter cartridge 301 is inserted through the opening 306, the user will compress an elastomeric spring 311 against the filter mounting head 309 illustrated in FIG. 8. Then, the user will rotate the filter cartridge 301 causing the three retention tabs 310 enter the retaining slots 315 and to axially align with the inward projecting shoulders 304 of the filter mounting head 309. As the three retention tabs 310 have radii R3 (see FIG. 8) greater than the inner radius R4 of the shoulders 304, the three retention tabs 310 will axially abut corresponding shoulders 304 of the filter mounting head 309 and be unable to move axially relative to the filter mounting head 309, thereby coupling the filter cartridge 301 to the filter mounting head 309. The spring 311 will tend to bias the filter cartridge 301 away from the filter mounting head 309 causing the retention tabs 310 to axially press against the inward projecting shoulders 304 of the filter mounting 301. This biasing action increases the friction between the retention tabs 310 and inward projecting shoulders 304 to prevent the filter cartridge 301 from rotating and being inadvertently removed from the filter mounting head 309. The channels may also be ramped slightly so as to prevent movement.

To remove the filter cartridge 301, a user would rotate the filter cartridge 301 until the retention tabs 310 again align with the insertion slots 305 of the filter mounting head 309, and then pull the filter cartridge 301 axially away from the filter mounting head 309. Each of the retention tabs 310 may form a recess region 312 facing the channel 314 formed by the interface between the upper and lower shells.

In this embodiment, the upper shell is permanently connected to the lower shell much like the connection for embodiment of FIG. 1. However, this embodiment may also use a releasable connection between shells such as shown in the second illustrated embodiment of FIGS. 3-4.

Figure 10:
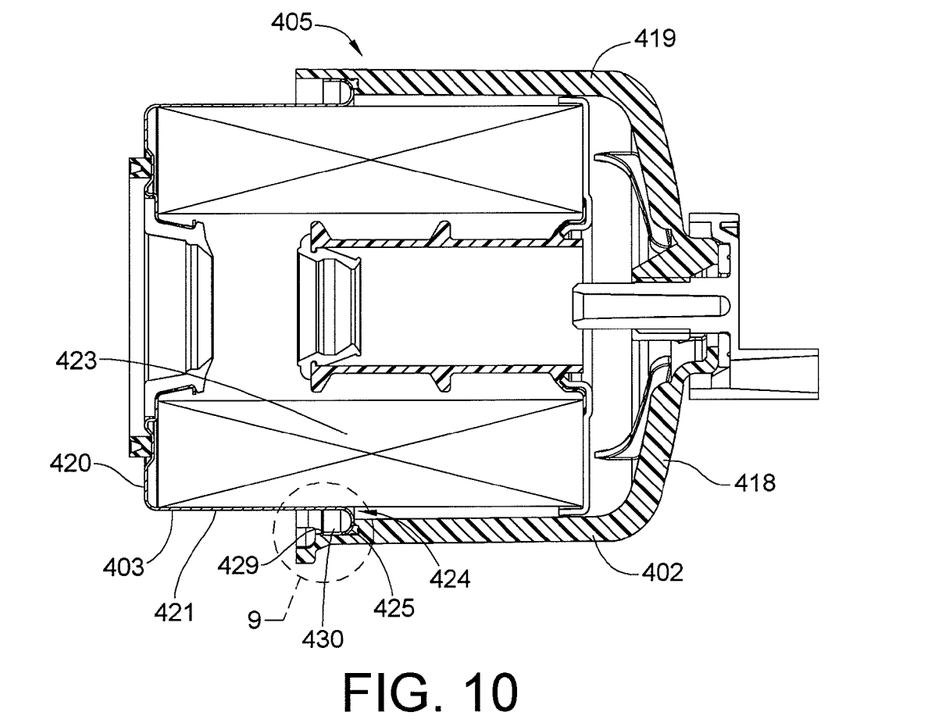
FIG. 10 is a cross-section of a filter in accordance with another embodiment of the present invention, the cross-section being the same cross-section as in FIG. 1.

FIG. 10 shows a further embodiment in which the upper shell 403 is made of metal such as stamped formed and/or drawn sheet steel, while the lower shell 402 is made of molded plastic. However, the embodiment could be practiced using a plastic upper shell 403. The filter cartridge 401 is again made by attaching the two shells 402, 403 by axially inserting the upper shell 403 into the lower shell 402. The upper shell 403 again includes a generally planar end wall 420 forming a generally closed end of the upper shell 403 and a generally cylindrical sidewall 421 providing an open end 424 of the upper shell 403. The sidewall 421 projects axially away from the end wall 420. The end of the sidewall 421 is folded back axially towards end wall 420 to form a small U-shaped curl 425 with a terminating edge 429 of the sidewall 421 facing axially toward end wall 420. The U-shaped curl 425 provides a cooperating cam surface on the underside that facilitates resilient deflection of the upper and/or lower shells during initial attachment (that is when the shells are axially pushed together).

This embodiment also includes a lower shell 402 which forms a collection bowl including a domed end wall 418 that transitions into a generally cylindrical sidewall 419. The sidewall 419 defines an open end 423 of the lower shell 402 opposite a generally closed end formed end wall 418.

Figure 11:
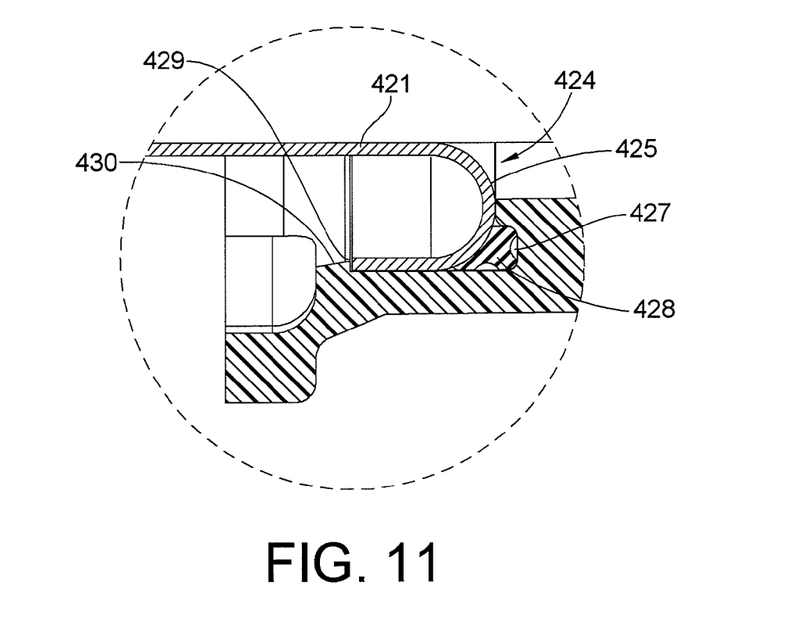
FIG. 11 is an enlarged view of FIG. 10, taken about circle 9.

FIG. 11 is an enlarged partial illustration of the connection between the upper and lower shells 402, 403. When the shells are pushed together, terminating edge 429 of the U-shaped curl 425 engages radially inward extending projections 430 formed in the inner surface of sidewall 419 of the lower shell 402 causing interference preventing the upper and lower shells 402, 403 from being separated. The upper shell 403 is axially inserted into the lower shell 402 during assembly and the U-shaped bowl 425 snap-fit engages the inward extending projections 430. The U-shaped bowl 425 is inserted so that the open end 424 of the upper shell 403 axially faces the end wall 418.

Formed into the sidewall 419 of the lower shell 402 is an annular channel 427. The lower shell 402 is attached to the upper shell 403 by placing the U-shaped bowl 425 so that it compresses a ring seal 428 within the annular channel 427. This provides a fluid-tight seal to prevent a leakpath between the metal and plastic. The ring seal also provides a biasing force acting against the snap fit connection.

Figure 12:
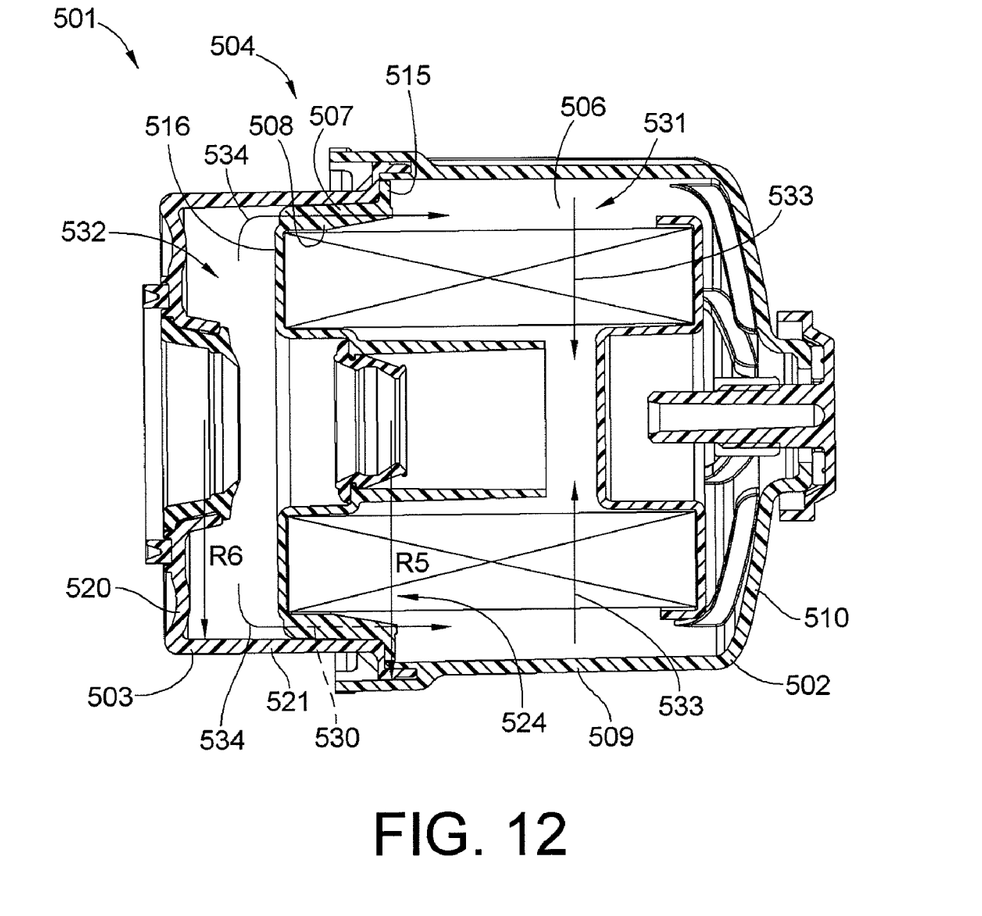
FIG. 12 is a cross-section of a filter in accordance with another embodiment of the present invention, the cross-section being the same cross-section as in FIG. 1.
Figure 13:
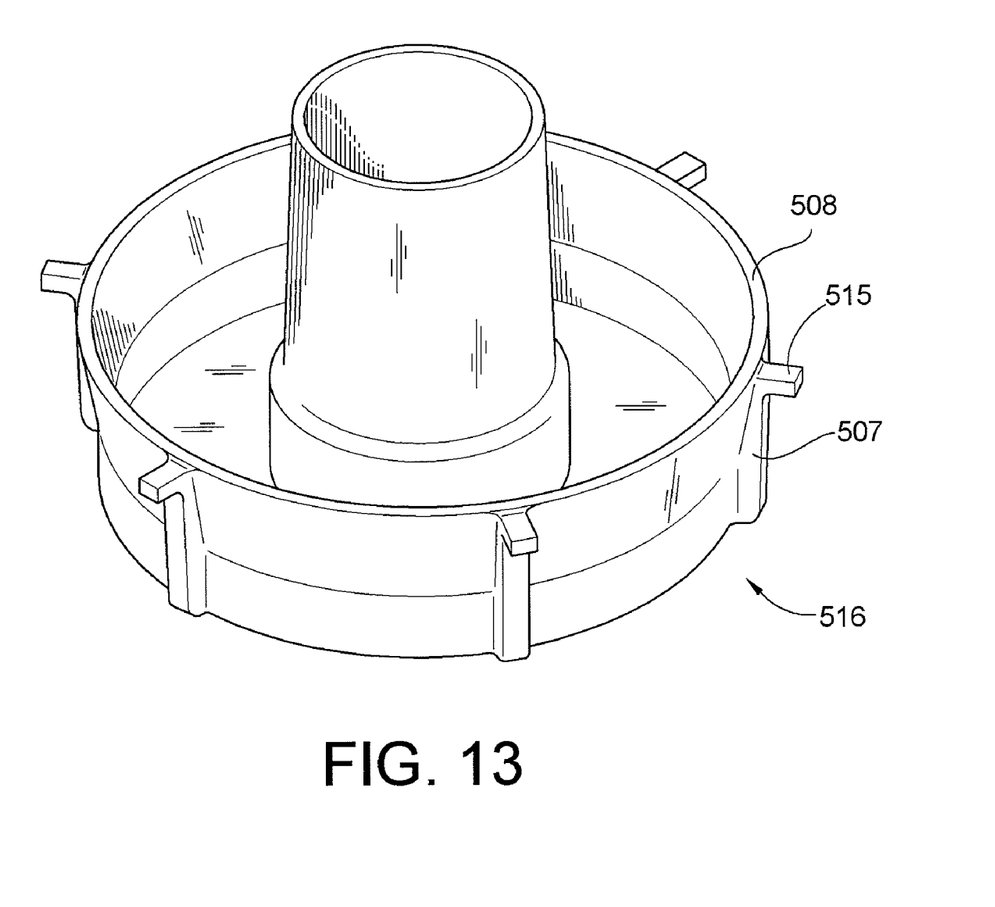
FIG. 13 is an isometric view of the upper reverse flow end cap used in the embodiment of FIG. 12.
Figure 14:
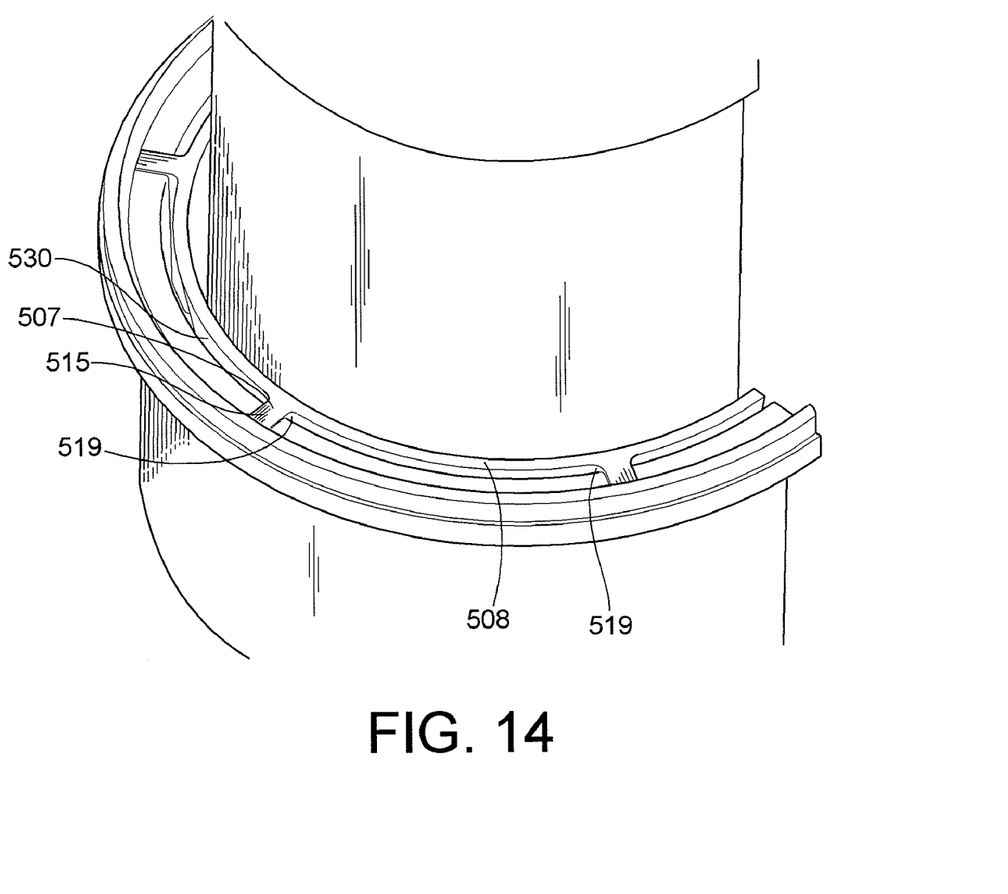
FIG. 14, is a partially cut away view of the mounting interface between the upper shell and the reverse flow end cap of FIG. 12.

FIGS. 12-14 shows a further embodiment of a filter cartridge referred to as a "reverse flow" cartridge. This reverse flow feature is useable with any of the above embodiments in that it alters the flow of fluid through the cartridge internally. This cartridge reverses the flow around an internal upper end cap as opposed to flowing through and around the lower end cap. This is schematically indicated by flow path line 534 (and 533 showing subsequent flow of fluid inward through the media).

The filter cartridge includes a lower shell 502 and an upper shell 503 forming a filter cartridge 501. In this embodiment, the lower shell 502 has a generally cylindrical sidewall 509 that transitions into a domed end wall 510. The upper shell 503 is made of plastic, and has a generally planar end wall 520 forming a generally closed end of the upper shell 503 and a generally cylindrical sidewall 521 providing an open end 524 of the upper shell 503. The sidewall 521 projects axially away from the end wall 520, and transitions into a second cylindrical sidewall 525 with a radius R5 greater than the radius R6 of the first sidewall 521, the transition portion forms an abutment shoulder 528.

This embodiment differs from prior embodiments by virtue of having an upper internal end cap 516 (thus the upper shell is not an end cap in this embodiment). The annular end cap 516 is sealingly connected and may be potted with plastisol to the upper end of the filter media 506. The upper end cap 516 also positions and secures the filter media 506 within the filter housing 504 to facilitate the flow reversal through the creation of space between the upper shell 503 and the upper end cap 516.

To position the filter media 506 inside of the housing, end cap 516 includes a plurality of ribs 507 at spaced angular and equal intervals about its circular periphery along a solid skirt portion 508. These ribs 507 have radial extensions 515 that are received and can be mounted into corresponding recesses 519 formed at corresponding angular locations in the upper shell section. The radial extension 515 extend radially outward from the portion of the ribs 507 farthest from the end cap 516, that is proximate the bottom of the ribs. The ribs 507 are angularly spaced apart defining flow passages 530 therebetween. The flow passages 530 permit fluid to flow between a fuel chamber 531 formed between the filter media 506 and the cylindrical sidewall 509 of the lower shell 502 and an upper fuel chamber 532 formed between the upper shell 503 and the annular end cap 516. Fluid flow through flow passages 530 is illustrated by fluid flow arrows 534.

When the upper shell 503 and annular end cap 516 are formed from plastic, the annular flange 508 may be secured to the abutment shoulder 528 by ultrasonic welding, adhesives, etc.

In prior filters a spring was needed to bias an end cap and filter media within a filter cartridge against the upper shell. This spring transferred a significant compressive load to filter media, which, when immersed in fluid during operation, has reduced structural resistance to collapse. In the present embodiment a spring is unnecessary, as the filter media 506 is permanently attached to and axially positioned within the filter cartridge 501 by the end cap 516 and is radially positioned by the end cap's 516 attachment to the abutment shoulder 528, axially affixing the end cap 516 to the upper shell 503. Therefore, the filter media 506 is not subject to the load that a biasing spring would apply.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter apparatus, comprising: a filter cartridge having upper and lower shells forming a housing, the upper shell having an upper end wall and an upper annular wall, the lower shell having a lower end wall and a lower annular wall, the upper annular wall extending from the upper end wall toward the lower end wall, lower annular wall extending from the lower end wall toward the upper end wall, the upper and lower walls being connected, at least one opening in the upper end wall for providing fluid communication, filter media permanently and irremovably joined to the upper shell and arranged to filter fluid, and wherein the lower annular wall extends over and around the upper shell to provide a skirt, wherein the skirt of the lower annular wall defines a retention structure adapted for releasable attachment of the filter cartridge.

2. The filter apparatus of claim 1, wherein the retention structure comprises a plurality of retention tabs extending radially outward and different angular locations about the lower shell, and wherein the retention structure is exclusively formed by the lower shell, independent of the upper shell.

3. The filter apparatus of claim 1, wherein the retention structure includes at least one thread formed on a cylindrical wall of the lower shell.

4. The filter apparatus of claim 1, wherein the upper and lower shells are permanently attached wherein the filter cartridge is entirely disposable.

5. The filter apparatus of claim 1, wherein the lower shell forms a mounting bowl, and wherein the upper shell is releasably connected to the lower shell such that the upper shell and the filter media are removable and disposable while the mounting bowl is reusable.

6. The filter apparatus of claim 1, wherein filter cartridge is a fuel filter cartridge adapted to filter water from fuel and particulates from fuel, and wherein the lower shell is at least partially transparent to integrally provide a water level indicator in the fuel filter cartridge, the lower shell including a drain port for gravitational draining of water, and further including a drain valve arranged to open and close the drain port.

7. The filter apparatus of claim 1, wherein the filter apparatus comprises a mounting base in combination with the filter cartridge, the mounting base having a cup shaped receptacle including a base annular wall, the filter cartridge having a mounted state wherein the upper shell is substantially received in the cup shaped receptacle with the base annular wall substantially surrounding the upper shell and received into a channel formed between the skirt of the lower shell and the upper annular wall of the upper shell, the mounting base further including a pair of concentrically arranged fluid conduits for inlet and outlet flow received into the opening in the upper shell.

8. A filter apparatus, comprising: a filter cartridge, including
 a housing having upper and lower shells connected together to define a internal cavity;
 filter media arranged in internal cavity to filter fluid passing through the filter media between an inlet and an outlet, the filter media separating water from the fluid when fluid is passed therethrough, the filter media being adjacent to, and at least partially surrounded by, at least a portion of an annular wall of the lower shell;
 the lower shell being at least partially transparent for indicating water in the internal cavity; and
 a drain valve on the housing adapted to be opened for draining water from the internal chamber.

9. The filter apparatus of claim 8, wherein the lower shell is molded of plastic material to integrally provide said at least partially transparent.

10. The filter apparatus of claim 8, wherein the upper and lower shells are permanently joined together to form a disposable filter cartridge.

11. The filter apparatus of claim 8, wherein the filter apparatus comprises a mounting base in combination with the filter cartridge, the mounting base having a cup shaped receptacle including a base annular wall, the filter cartridge having a mounted state wherein the upper shell is substantially received in the cup shaped receptacle with the base annular wall substantially surrounding the upper shell and received into a channel formed between the skirt of the lower shell and the upper annular wall of the upper shell, the mounting base further including a pair of concentrically arranged fluid conduits for inlet and outlet flow received into an opening in the upper shell.

12. The filter apparatus of claim 8, wherein the upper shell has an upper end wall and an upper annular wall, the lower shell has a lower end wall and the lower annular wall, the upper annular wall extending from the upper end wall toward the lower end wall, the lower annular wall extending from the lower end wall toward the upper end wall, the upper and lower walls being connected.

13. A filter apparatus, comprising: a filter cartridge having upper and lower shells forming a housing, the upper shell having an upper end wall and an upper annular wall, the lower shell having a lower end wall and a lower annular wall, the upper annular wall extending from the upper end wall toward the lower end wall, lower annular wall extending from the lower end wall toward the upper end wall, the upper and lower walls being connected, at least one opening in the upper end wall for providing fluid communication, a ring of filter media sealingly bonded to the upper shell and arranged to filter fluid, wherein the lower shell forms a mounting bowl, and wherein the upper shell is releasably connected to the lower shell such that the upper shell and the filter media are removable and disposable while the mounting bowl can be reusable.

14. The filter apparatus of claim 13, wherein the lower shell is a molded plastic member being at least partially transparent, further including a drain port in the lower shell and a drain valve arranged to open and close the drain port.

15. The filter apparatus of claim 13, further comprising a seal arranged between the upper annular wall and the lower annular wall.

16. The filter apparatus of claim 15, wherein the seal is carried by the upper shell section and thereby disposable with the upper shell and filter media.

17. The filter apparatus of claim 13, wherein the lower annular wall extends over and around the upper end wall to provide a skirt, wherein the skirt of the lower annular wall defines a retention structure adapted for releasable attachment of the filter cartridge to a mounting base.

18. The filter apparatus of claim 17, wherein the filter apparatus comprises the mounting base in combination with the filter cartridge, the mounting base having a cup shaped receptacle including a base annular wall, the filter cartridge having a mounted state wherein the upper shell is substantially received in the cup shaped receptacle with the base annular wall substantially surrounding the upper shell and received into a channel formed between the skirt of the lower shell and the upper annular wall of the upper shell, the mounting base further including a pair of concentrically arranged fluid conduits for inlet and outlet flow received into an opening in the upper shell.

19. A filter apparatus, comprising: a filter cartridge having upper and lower shells forming a housing, the upper shell having an upper end wall and an upper annular wall, the lower shell having a lower end wall and a lower annular wall, the upper annular wall extending from the upper end wall toward the lower end wall, lower annular wall extending from the lower end wall toward the upper end wall, the upper and lower walls being connected, at least one opening in the upper end wall for providing fluid communication, filter media arranged to filter fluid in the housing, and wherein a projecting skirt is provided along the housing, wherein the projecting skirt defines a plurality of discrete retention tabs integrally molded into the projecting skirt at different angular locations, and wherein the projecting skirt is formed exclusively in the lower shell, independent of the upper shell.

20. The filter apparatus of claim 19, wherein the retention tabs extend radially outward relative to a remainder of the skirt and wherein discrete cavities are formed behind each of the retention tabs.

21. The filter apparatus of claim 19, wherein the retention tab are molded into the skirt at equal angular intervals about the skirt and formed on the lower shell.

22. The filter apparatus of claim 19, wherein the filter apparatus comprises the mounting base in combination with the filter cartridge, the retention tabs retaining the filter cartridge to the base in a mounted state, the mounting base having a cup shaped receptacle including a base annular wall, the filter cartridge having a mounted state wherein the upper shell is substantially received in the cup shaped receptacle with the base annular wall substantially surrounding the upper shell and received into a channel formed between the skirt of the lower shell and the upper annular wall of the upper shell, the mounting base further including a pair of concentrically arranged fluid conduits for inlet and outlet flow received into an opening in the upper shell.

23. A filter cartridge, comprising:
upper and lower shells forming a housing, the upper shell having an upper end wall and an upper annular wall, the lower shell having a lower end wall and a lower annular wall, the upper annular wall extending from the upper end wall toward the lower end wall, lower annular wall extending from the lower end wall toward the upper end wall, the upper and lower walls being connected;
a first opening in the upper end wall for providing fluid communication, a first seal member disposed along the first opening;
a ring of filter media arranged in the housing;
a flow reversing end cap inside the housing and sealingly attached to one end of the filter media, the flow reversing end cap having a second opening generally concentric with the first opening and a second seal member disposed along the second opening;
a second end cap sealingly attached to another end of the filter media;
ribs disposed between the housing and the flow reversing end cap, the ribs integrally joining the flow reversing end cap and the housing.

24. The filter cartridge of claim 23, wherein the housing and the flow reversing end cap are plastic structures, and wherein the ribs are molded into the flow reversing end cap and plastically welded or adhesively secured to the upper shell in a plurality of corresponding pockets formed internally into the upper shell section.

25. The filter cartridge of claim 23, wherein the second opening forms an outlet and the first opening forms an inlet, wherein the cartridge is adapted to direct fuel into the filter element through inlet of the first opening and around the flow reversing end cap, through the filter media and to the outlet of the second opening, wherein the second end cap is spaced from a body of the lower shell to create a flow path therebetween leading to a drain port, further including a drain valve arranged to open and close the drain port.

* * * * *

UNITED STATES PATENT AND TRADEMARK OFFICE
CERTIFICATE OF CORRECTION

| | | |
|---|---|---|
| PATENT NO. | : 8,147,691 B2 | Page 1 of 1 |
| APPLICATION NO. | : 11/858944 | |
| DATED | : April 3, 2012 | |
| INVENTOR(S) | : Timothy L. Krull et al. | |

It is certified that error appears in the above-identified patent and that said Letters Patent is hereby corrected as shown below:

The cover page of the referenced patent incorrectly states the city and state of the Item 73 Assignee, Baldwin Filters, Inc., as Rockford, IL (US). The correct city and state of the Assignee, Baldwin Filters, Inc., should be: Kearney, NE (US)

Signed and Sealed this
Nineteenth Day of June, 2012

David J. Kappos
*Director of the United States Patent and Trademark Office*